(12) United States Patent
Yang

(10) Patent No.: US 12,716,793 B2
(45) Date of Patent: Aug. 25, 2026

(54) HAND DYNAMOMETER STRUCTURE

(71) Applicant: Zhongshan Shenmeng Innovation Technology Co., Ltd., Zhongshan City (CN)

(72) Inventor: Ai Yang, Zhongshan City (CN)

(73) Assignee: Zhongshan Shenmeng Innovation Technology Co., Ltd., Zhongshan City (CN)

( * ) Notice: Subject to any disclaimer, the term of this patent is extended or adjusted under 35 U.S.C. 154(b) by 288 days.

(21) Appl. No.: 18/422,322

(22) Filed: Jan. 25, 2024

(65) Prior Publication Data

US 2025/0198864 A1 Jun. 19, 2025

(30) Foreign Application Priority Data

Dec. 13, 2023 (CN) ........................ 202323408542.6

(51) Int. Cl.
*G01L 5/00* (2006.01)

(52) U.S. Cl.
CPC .................................. *G01L 5/0028* (2013.01)

(58) Field of Classification Search
CPC .................................................... G01L 5/0028
USPC .................................................... 73/862.381
See application file for complete search history.

(56) References Cited

U.S. PATENT DOCUMENTS 3,672,219 A * 6/1972 Van Patten .............. A61B 5/22
482/49
2024/0197224 A1* 6/2024 Youngblood .......... G16H 40/67

FOREIGN PATENT DOCUMENTS

CN 2292283 Y * 9/1998
CN 205729381 U * 11/2016

* cited by examiner

*Primary Examiner* — Marrit Eyassu
(74) *Attorney, Agent, or Firm* — Birchwood IP

(57) ABSTRACT

The present invention discloses a hand dynamometer structure, comprising a housing, a sensor element provided within the housing, and a gripping part connected to the sensor element. The housing includes a main body having an installation cavity, a connection port at the lower part, and guide members on both sides. The gripping part is positioned between and movable relative to the guide members. The main body and the guide members form an integrated structure. An installation opening is formed at the front or rear side of the main body, with a cover plate at the installation opening. The side wall of the main body is provided with an information screen opening and button openings communicating with the installation cavity. Compared to the prior art, the present invention integrates the side cover directly into the main body, effectively improving the overall strength and reducing the assembly steps, which improves production efficiency.

5 Claims, 6 Drawing Sheets

--Prior Art--

--Prior Art--

HAND DYNAMOMETER STRUCTURE

FIELD OF INVENTION

The present invention relates to a hand dynamometer structure.

BACKGROUND OF THE INVENTION

As shown in FIGS. 5 and 6 of the prior art, in existing hand dynamometers, a housing is composed of a main body 104 and a side cover 103. The main body 104 is composed of a front shell 101 and a rear shell 102. The side cover is designed with an opening that allows a display screen and buttons to be installed on the side, so that information can be displayed through this opening and users can easily press the buttons for control.

However, a technical problem in the prior art is that, since the side cover is attached to the main body 104 by snaps, when the gripping member 20 is pulled, the main body 104 is subjected to a force and consequently transmits the force to the side cover 103. Tests show that when the pulling force exceeds 100 kilograms, the side cover 103 may bulge on the side or even be damaged, resulting in the entire side cover being detached. In addition, the existing main body 104 is composed of the front shell and the rear shell. In the manufacturing process, the front shell and the rear shell must first be assembled, followed by attaching the side cover to the main body. This entire assembly process is cumbersome.

SUMMARY OF THE INVENTION

The present invention aims to address at least one of the technical problems of the prior art. To accomplish this, the present invention proposes an integrated side cover structure for a hand dynamometer.

A hand dynamometer structure designed for this purpose comprises a housing, a sensor element provided within the housing, and a gripping part connected to the sensor element. The housing includes a main body having an installation cavity therein. A connection port is formed at the lower part of the main body, and guide members are also formed on both sides of the main body. The gripping part is positioned between and movable relative to the guide members. The main body and the guide members form an integrated structure. An installation opening is formed at the front or rear side of the main body, and a cover plate is provided at the installation opening.

An information screen opening for displaying information and button openings for touch control are provided on the side wall of the main body. The information screen opening and the button openings are communicatively connected to the installation cavity.

Compared to the prior art, the present invention integrates the side cover directly into the main body to form an integrated structure. With the information screen and button openings for information display and touch control, the integrated main body effectively enhances overall strength and reduces assembly steps during manufacturing, thereby improving production efficiency.

DETAILED DESCRIPTION OF THE PREFERRED EMBODIMENTS

Figure 1:
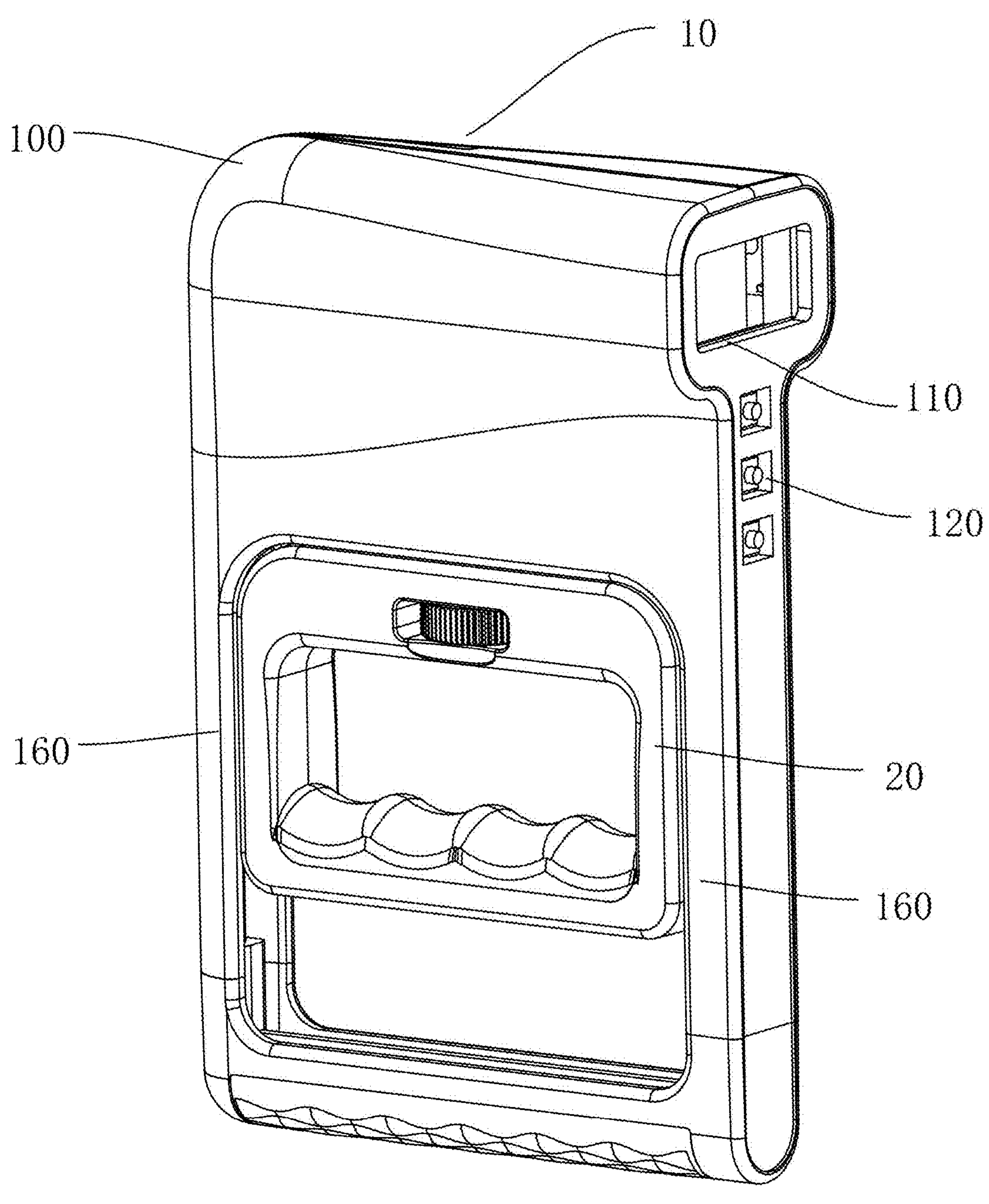
FIG. 1 is a schematic diagram of one of the three-dimensional structures of the present invention.

The present invention is further described below in conjunction with the drawings and embodiments.

Referring to FIGS. 1-4, a hand dynamometer structure comprises a housing 10, a sensor element 30 provided within the housing 10, and a gripping part 20 connected to the sensor element 30. The housing 10 includes a main body 100 having an installation cavity 101 therein. A connection port 103 is formed at the lower part of the main body 100, and guide members 160 are also formed on both sides of the main body 100. The gripping part 20 is positioned between and movable relative to the guide members 160. The main body 100 and the guide members 160 form an integrated structure. An installation opening 104 is formed at the front or rear side of the main body 100, and a cover plate 130 is provided at the installation opening 104.

An information screen opening 110 for displaying information and button openings 120 for touch control are provided on the side wall of the main body 100. The information screen opening 110 and the button openings 120 are communicatively connected to the installation cavity 101.

In this embodiment, the present invention employs an integrated molding structure for the housing 10. This structure eliminates the multi-part configuration of the front shell, rear shell, and side cover in the prior art, thereby enhancing the overall strength and avoiding problems associated with the side cover being damaged under high tension. At the same time, this structure also reduces assembly steps, thereby effectively improving assembly efficiency.

In the present invention, the housing 10 can be formed by injection molding.

Figure 4:
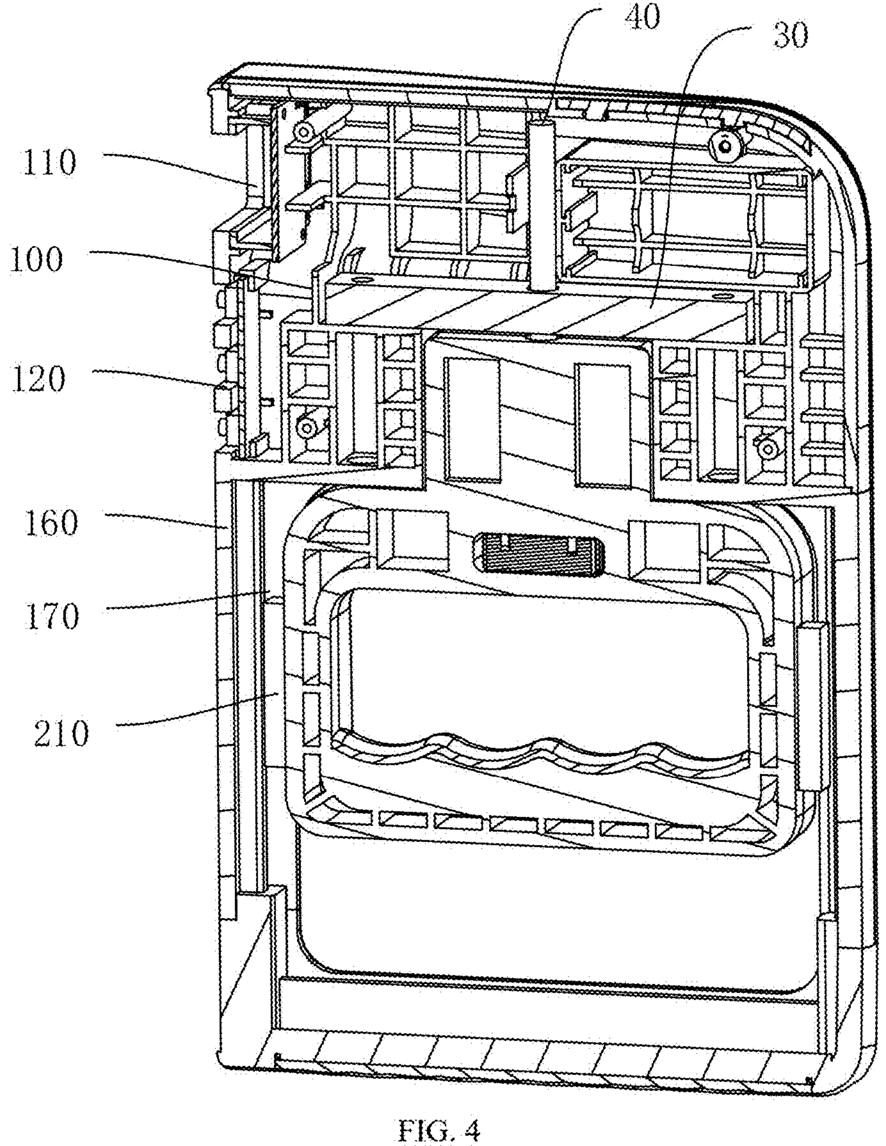
FIG. 4 is a schematic cross-sectional structure diagram of the present invention.
Figure 5:
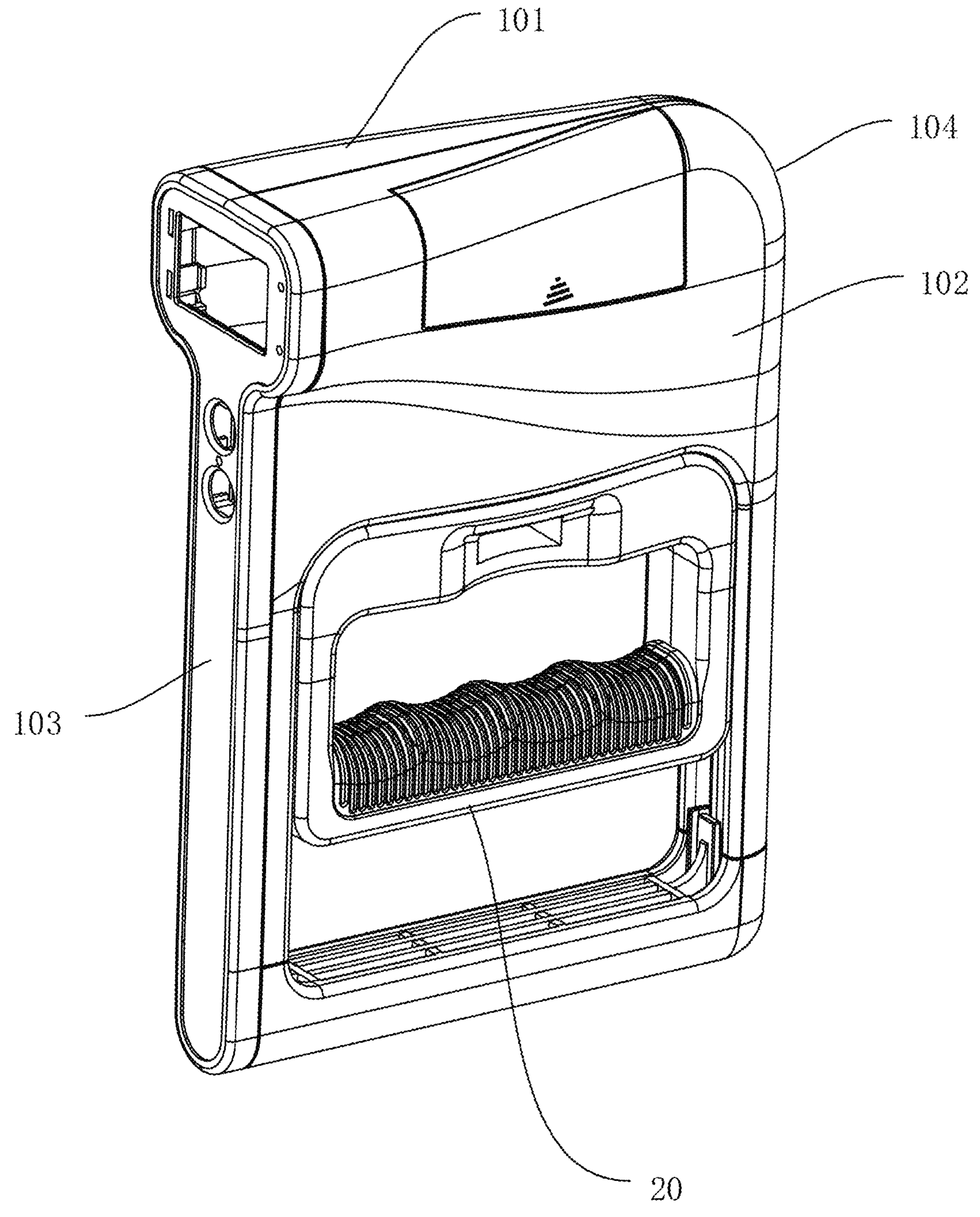
FIG. 5 is a schematic diagram of the three-dimensional structure of the prior art.
Figure 6:
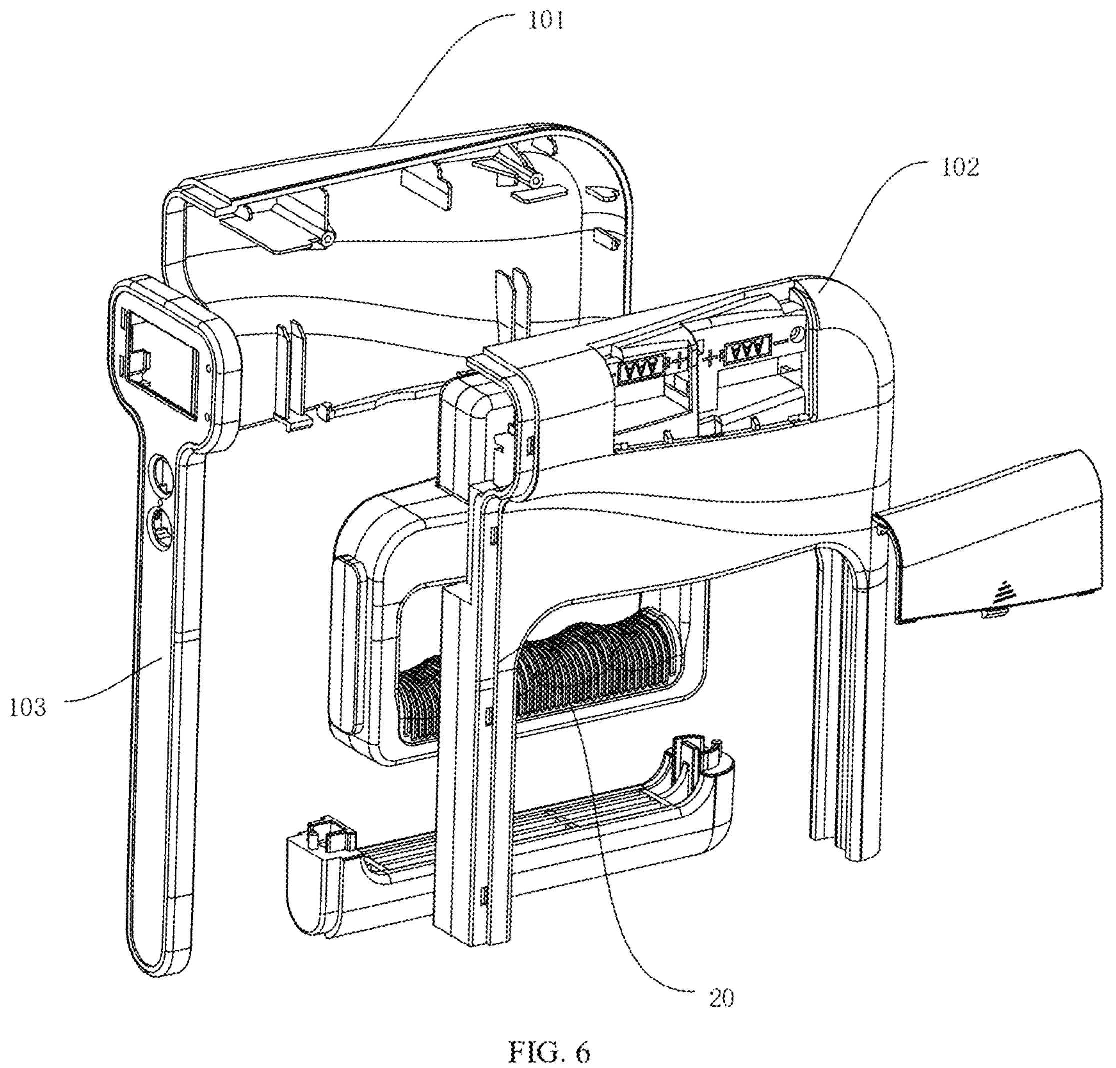
FIG. 6 is a schematic diagram of the exploded structure of the prior art.

Referring to FIG. 4, the sensor element 30 is provided within the installation cavity 101, and the upper end of the gripping part 20 has a connecting element 40 passing through the connection port 103 to connect with the sensor element 30. Since the sensor element 30 is a conventional component, it will not be further described herein.

Figure 3:
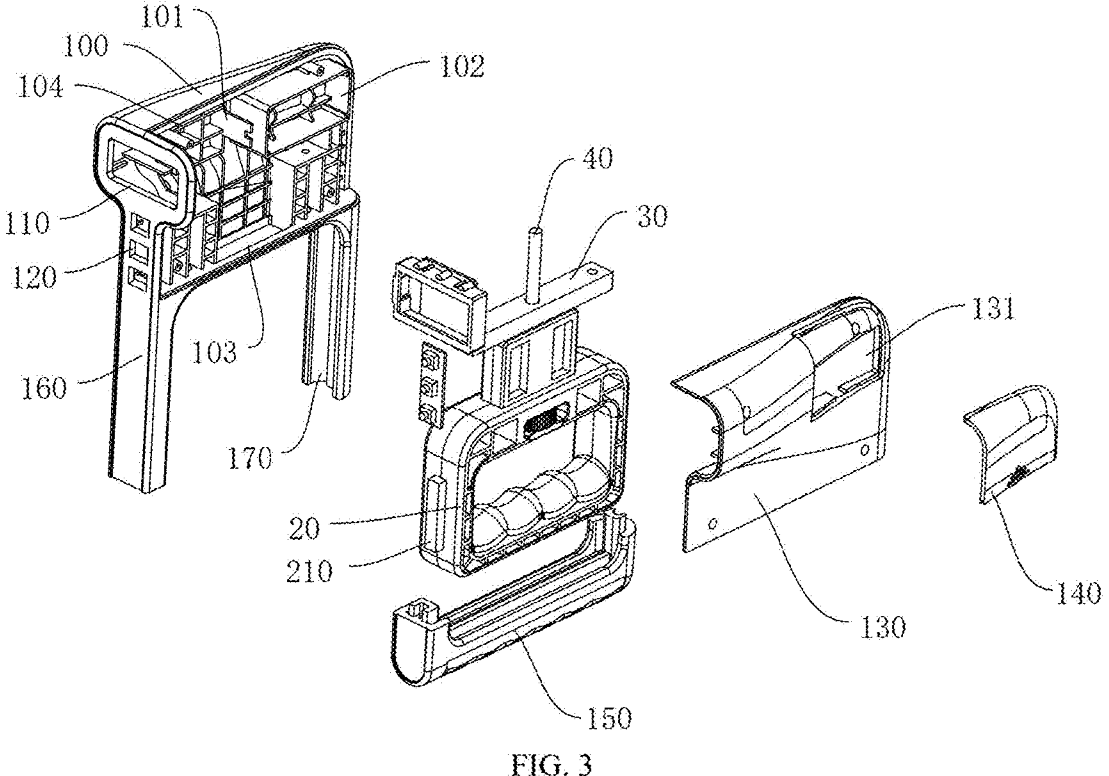
FIG. 3 is a schematic diagram of the exploded structure of the present invention.

Referring to FIG. 3, the installation cavity 101 houses a battery compartment 102, and a battery installation opening 131 is provided at a position corresponding to the battery compartment 102 on the cover plate (130), with a battery cover 140 positioned at the battery installation opening 131. When the battery needs to be replaced, opening the battery cover 140 allows the battery in the battery compartment to be removed and replaced.

Referring to FIGS. 3 and 4, an end face of the one guide member 160 and a corresponding end face of the other guide member 160 are each equipped with a guide groove 170. The left and right sides of the gripping part 20 are each provided with a guide block 210 for active engagement in the guide groove 170.

Figure 2:
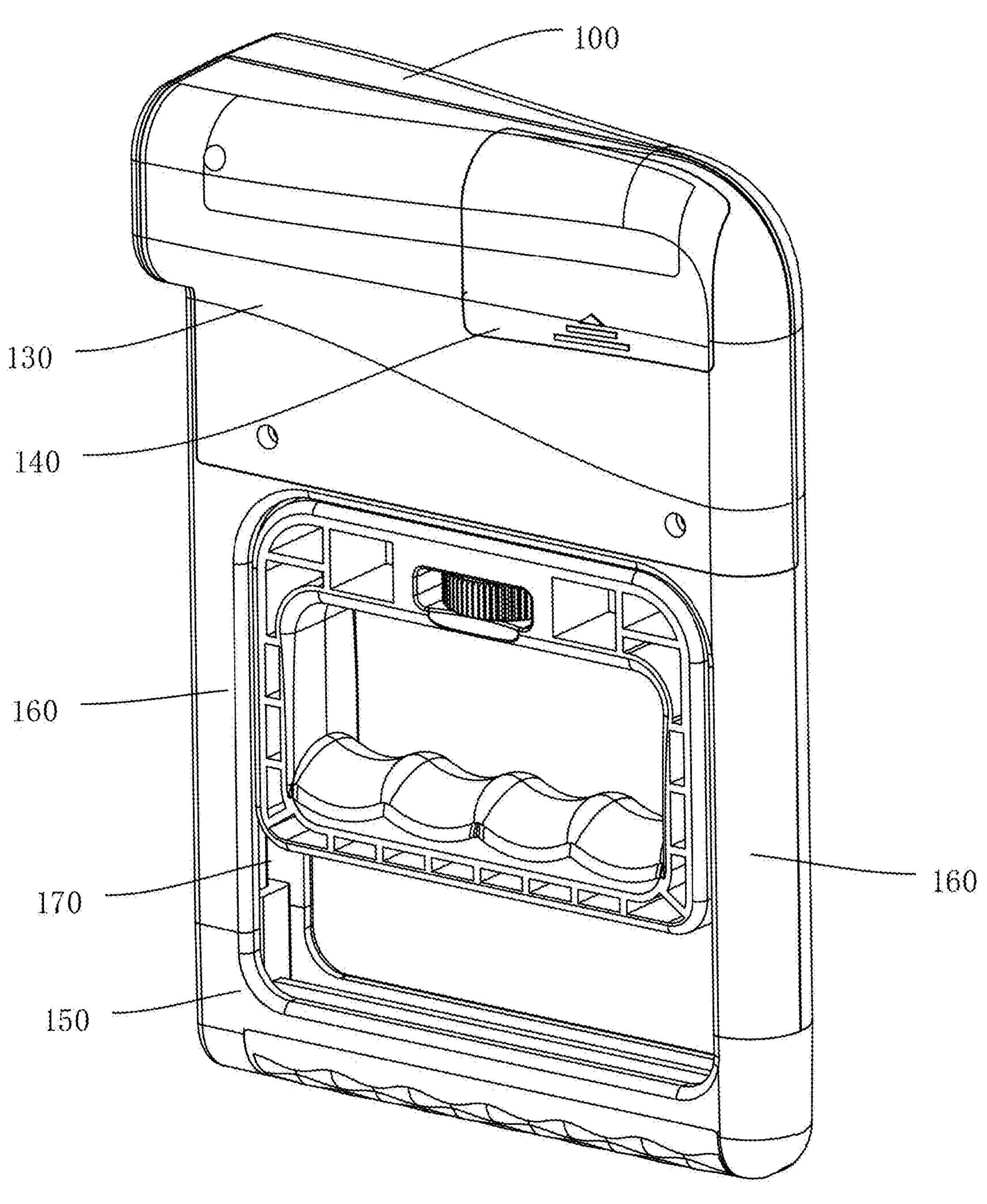
FIG. 2 is a schematic diagram of another three-dimensional structure of the present invention.

Referring to FIGS. 1 to 3, a position limiting member 150 is detachably connected at the lower ends of the two guide members 160.

The position limiting member 150 is secured to the guide members 160 by bolts.

In the description of the present invention, it should be understood that terms such as "center", "longitudinal", "lateral", "length", "width", "thickness", "top", "bottom", "front", "rear", "left", "right", "vertical", "horizontal", "upper", "lower", "inner", "outer", "clockwise", "counterclockwise", etc., indicate the orientation or positional relationship based on the orientation or positional relationship shown in the drawings. These terms are used for descriptive purposes and are not to be construed as limiting, indicating, or implying any particular orientation, construction or operation for the devices or components referred to. Therefore, it should be understood that the terms "first," "second," etc., are used for descriptive purposes only and do not imply or suggest any relative importance or indicate the quantity of technical features indicated.

The foregoing illustrates and describes the basic principles and main features of the present invention and its advantages. Those skilled in the art should understand that the present invention is not limited to the embodiments described above. The embodiments and descriptions in the specification are intended only to illustrate the principles of the present invention. Within the scope and spirit of the present invention, various modifications and improvements may be made which fall within the scope of protection defined by the appended claims and their equivalents.

What is claimed is:

1. A hand dynamometer structure, comprising a housing (10), a sensor element (30) provided within the housing (10), and a gripping part (20) connected to the sensor element (30), characterized in that: the housing (10) includes a main body (100) having an installation cavity (101) therein, a connection port (103) is formed at the lower part of the main body (100), and guide members (160) are also formed on both sides of the main body (100), and the connection port (103) connects to the guide members (160); the gripping part (20) is positioned between and movable relative to the guide members (160), and the main body (100) and the guide members (160) form an integrated structure; an installation opening (104) is formed at a front or rear side of the main body (100), and a cover plate (130) is provided at the installation opening (104);

an information screen opening (110) for displaying information and button openings (120) for touch control are provided on the side wall of the main body (100), and the information screen opening (110) and the button openings (120) are communicatively connected to the installation cavity (101).

2. The hand dynamometer structure according to claim 1, wherein the sensor element (30) is provided within the installation cavity (101), and the upper end of the gripping part (20) has a connecting element (40) passing through the connection port (103) to connect with the sensor element (30).

3. The hand dynamometer structure according to claim 1, wherein the installation cavity (101) houses a battery compartment (102), and a battery installation opening (131) is provided at a position corresponding to the battery compartment (102) on the cover plate (130), with a battery cover (140) positioned at the battery installation opening (131).

4. The hand dynamometer structure according to claim 1, wherein an end face of the one guide member (160) and a corresponding end face of the other guide member (160) are each equipped with a guide groove (170), and both sides of the gripping part (20) are each provided with a guide block (210) for active engagement in the guide groove (170).

5. The hand dynamometer structure according to claim 1, wherein a position limiting member (150) is detachably connected at the lower ends of the two guide members (160).

* * * * *